United States Patent
Ahn et al.

(10) Patent No.: US 8,565,262 B2
(45) Date of Patent: Oct. 22, 2013

(54) FREQUENCY REUSING METHOD IN WIRELESS COMMUNICATION SYSTEM AND RADIO ACCESS STATION SYSTEM FOR THE SAME

(75) Inventors: Jae-Hyun Ahn, Seoul (KR);
Hyung-Joon Jeon, Seongnam (KR);
Jae-Hyeong Kim, Seoul (KR)

(73) Assignee: Intellectual Discovery Co., Ltd., Seoul (KR)

( * ) Notice: Subject to any disclaimer, the term of this patent is extended or adjusted under 35 U.S.C. 154(b) by 1122 days.

(21) Appl. No.: 12/441,379

(22) PCT Filed: Sep. 28, 2007

(86) PCT No.: PCT/KR2007/004735
§ 371 (c)(1),
(2), (4) Date: Mar. 13, 2009

(87) PCT Pub. No.: WO2008/039012
PCT Pub. Date: Apr. 3, 2008

(65) Prior Publication Data
US 2009/0232080 A1    Sep. 17, 2009

(30) Foreign Application Priority Data
Sep. 29, 2006    (KR) .................. 10-2006-0096209

(51) Int. Cl.
*H04J 3/16* (2006.01)
(52) U.S. Cl.
USPC ............ 370/468; 370/208; 370/338; 370/465
(58) Field of Classification Search
None
See application file for complete search history.

(56) References Cited

U.S. PATENT DOCUMENTS

| | | | |
|---|---|---|---|
| 5,257,398 A | 10/1993 | Schaeffer | |
| 6,546,254 B2 | 4/2003 | Fitzgerald | |
| 7,373,150 B2* | 5/2008 | Cho et al. | 455/447 |
| 7,602,843 B2* | 10/2009 | Cho et al. | 375/228 |
| 7,969,859 B2* | 6/2011 | Khan et al. | 370/208 |
| 8,116,216 B2* | 2/2012 | Nogami et al. | 370/252 |
| 2005/0074030 A1* | 4/2005 | Cho et al. | 370/474 |
| 2007/0058603 A1* | 3/2007 | Song et al. | 370/342 |
| 2007/0060145 A1* | 3/2007 | Song et al. | 455/445 |
| 2008/0037661 A1* | 2/2008 | Xun | 375/259 |

FOREIGN PATENT DOCUMENTS

| | | |
|---|---|---|
| JP | 08-214364 A | 8/1996 |
| JP | 2001-231077 A | 8/2001 |
| KR | 1020060048106 A | 5/2006 |
| KR | 1020060120090 A | 11/2006 |
| KR | 1020070007933 A | 1/2007 |
| WO | WO2006/016330 A1 | 2/2006 |

OTHER PUBLICATIONS

International Search Report for application PCT/KR2007/004735 filed Sep. 28, 2007.
Written Opinion of the International Searching Authority for application PCT/KR2007/004735 filed Sep. 28, 2007.

* cited by examiner

*Primary Examiner* — John Blanton
*Assistant Examiner* — Jay P Patel

(57) ABSTRACT

The present invention relates to a wireless communication system, and more particularly, to a frequency reusing method for efficiently transmitting traffics in a radio access station system. A frequency reusing method in a wireless communication system including a coverage region, which has first, second and third regions comprises (a) transmitting traffics by assigning a total frequency band, which includes different three sub-frequency bands, to the first, second and third regions during a first interval; and (b) transmitting the traffics by respectively assigning the different three sub-frequency bands to the first, second and third regions during a second interval.

30 Claims, 5 Drawing Sheets

FREQUENCY REUSING METHOD IN WIRELESS COMMUNICATION SYSTEM AND RADIO ACCESS STATION SYSTEM FOR THE SAME

TECHNICAL FIELD

The present invention relates to a wireless communication system, and more particularly, to a frequency reusing method for efficiently transmitting traffics in a radio access station system of an orthogonal frequency division multiple access (OFDMA) type according to ate least one of IEEE 802.16, WiBro (Wireless Broadband Internet), and WiMAX standards and a radio access station system for the frequency reusing method.

BACKGROUND ART

Generally, a wireless communication system includes a portable subscriber station (PSS), a radio access station (RAS), a repeater and a contents server. The portable subscriber station (PSS) can use communication services, such as call connection, digital broadcast, digital media downloading, uploading, and so on, via the radio access station (RAS) in a wireless net. The contents server manages users of the portable subscriber station (PSS) and provides necessary contents to the portable subscriber station (PSS). If there is the radio access station (RAS) without the repeater in a region, a signal reception becomes poor in the region. The poor signal reception is compensated with the repeater.

Since there exists a limitation of available frequencies in a wireless communication system, the frequencies are assigned to the radio access stations (RAS) depending on their services. Moreover, the frequencies are used in duplicate by separating the radio access stations (RAS) from each other to avoid interference between adjacent radio access stations (RAS). In this case, a plurality of sectors in a cell of each radio access stations (RAS) may use different frequencies. The plurality of sectors may use frequencies at the same time.

FIG. 1 is a schematic view showing a conventional radio access station (RAS) using a plurality of frequency bands. In other word, FIG. 1 shows a frequency reuse factor-3 (FRF-3) type scheme. In more detail, in the conventional wireless communication system, a region, which one radio access station (RAS) covers, is divided into a plurality of sectors. The region is defined as a cell. Namely, the region is divided into first, second and third sectors 110, 120 and 130, and the first, second and third sectors 110, 120 and 130 constitute the cell. Then, different three frequency bands are assigned each sectors, and thereby providing communication services between the radio access station "RAS" and the portable subscriber stations (PSS) (not shown) in each sectors 110, 120 and 130. The radio access station "RAS" communicates the portable subscriber stations (PSS) in the first sector 110 using a first frequency band "FA1". The radio access station "RAS" communicates the portable subscriber stations (PSS) in the second sector 120 using a second frequency band "FA2". The radio access station "RAS" communicates the portable subscriber stations (PSS) in the third sector 130 using a third frequency band "FA3". In this case, each of the first, second and third sectors 110, 120 and 130 transmits the traffics using carrier waves respectively assigned to different frequency bands "FA1", "FA2" and "FA3".

In the conventional wireless communication system shown in FIG. 1, since each sectors uses different frequency bands, there are few interference in border region between adjacent sectors and between adjacent cells of adjacent radio access stations "RAS". Accordingly, there is no problem of decrease of a carrier to interference and noise ratio (CINR), and cell coverage increases. However, because each sector uses a single frequency band, there is a relatively lower system capacity than a wireless communication system shown in FIG. 2.

FIG. 2 is a schematic view showing a conventional radio access station (RAS) using an identical frequency. In other word, FIG. 2 shows a frequency reuse factor-1 (FRF-1) type scheme. In the wireless communication system shown in FIG. 2, all sectors in each radio access station "RAS" uses an identical frequency "FA" to transmit the traffics. Accordingly, the system capacity is improved. Furthermore, as shown in FIG. 3, one control message following a preamble and a frame control header "FCH" in a data frame is transmitted repeatedly. The one control message may be transmitted six times.

However, in the wireless communication system in FIG. 2, signal interference at a border region 210 between adjacent sectors and a border region 220 between adjacent cells of adjacent radio access stations "RAS" is easily caused. Namely, since every sector and every cell uses identical frequency band to provide communication services in the wireless communication system, signal interference at the border region 210 between the adjacent sectors and the border region 220 between the adjacent cells of the adjacent radio access stations "RAS" is easily caused. As a result, a carrier to interference and noise ratio (CINR) of the portable subscriber station (PSS) decreases, and it is difficult to provide communication services. Communication service quality is deteriorated.

DISCLOSURE OF INVENTION

Technical Problem

As mentioned above, in the conventional wireless communication system adopting the frequency reuse factor-3 (FRF-3) type scheme shown in FIG. 1, which may be a relatively high frequency reuse factor (FRF), since each sectors uses different frequency bands, there are few interference in border region between adjacent sectors and between adjacent cells of adjacent radio access stations (RAS). However, because each sector uses one frequency band, there is a relatively low system capacity.

In the wireless communication system adopting the frequency reuse factor-1 (FRF-1) type scheme, which may be a relatively low frequency reuse factor (FRF), the system capacity is improved. However, a carrier to interference and noise ratio (CINR) of the portable subscriber station (PSS) decreases, and it is difficult to provide communication services. Moreover, communication service quality is deteriorated.

To solve the above problems, the present invention provides a frequency reusing method in a wireless communication system, where sectors or cells in a radio access station (RAS) are controlled to have different schemes.

Technical Solution

Accordingly, embodiments of the invention is directed to a frequency reusing method and a radio access station system for the frequency reusing method that substantially obviate one or more of the problems due to limitations and disadvantages of the related art are described.

An object of the embodiments of the invention is to provide a frequency reusing method and a radio access station (RAS)

system having advantages of both a relatively low frequency reuse factor (FRF) type scheme and a relatively high frequency reuse factor (FRF) type scheme except disadvantages of them by controlling to have different schemes depending on magnitude of communicated signal between the radio access station (RAS) and a portable subscriber station (PSS). In a first scheme, every sector or every cell uses a total frequency band having a plurality of sub-frequency bands. In a second scheme, each cell or each cell uses sub-frequency bands different from each other.

An object of the embodiments of the invention is to provide a frequency reusing method and a radio access station (RAS) system, where a frequency reusing plan is flexibly adopted considering signal interference between cells or between sectors and a magnitude of communicated signal between the radio access station (RAS) and a portable subscriber station (PSS), to maximize a cell coverage and a system capacity.

To achieve these and other advantages and in accordance with the purpose of embodiments of the invention, as embodied and broadly described, a frequency reusing method in a wireless communication system including a coverage region, which has first, second and third regions comprises (a) transmitting traffics by assigning a total frequency band, which includes different three sub-frequency bands, to the first, second and third regions during a first interval; and (b) transmitting the traffics by respectively assigning the different three sub-frequency bands to the first, second and third regions during a second interval.

In another aspect, a frequency reusing method in a wireless communication system including a plurality of coverage regions comprises (a) measuring a carrier to interference and noise ratio (CINR) from communication signals with a portable subscriber station; (b) producing a frequency reuse plan depending on the carrier to interference and noise ratio (CINR); and (c) transmitting one of a first traffic and a second traffic according to the frequency reuse plan, wherein the first traffic is transmitted to the plurality of coverage regions by assigning a total frequency band, which includes a plurality of sub-frequency bands, during a first interval, and wherein the second traffic is transmitted to the plurality of coverage regions by respectively assigning the plurality of sub-frequency bands to the plurality of coverage regions during a second interval, wherein a number of the plurality of coverage regions corresponds to a number of the plurality of sub-frequency bands.

In another aspect, a radio access station (RAS) system for a frequency reuse comprises a carrier to interference and noise ratio (CINR) measuring unit measuring a carrier to interference and noise ratio (CINR) of corresponding portable subscriber stations at a plurality of coverage regions; a frequency reuse (FR) determining unit determining a frequency reuse plan by comparing the carrier to interference and noise ratio (CINR) with one of first and second threshold values, the frequency reuse plan including a first scheme, where a total frequency band including a plurality of sub-frequency bands is assigned to the plurality of coverage regions to transmit traffics, and a second scheme, where the plurality of sub-frequency bands are respectively assigned to the plurality of coverage regions to transmit the traffics, wherein a number of the plurality of sub-frequency bands corresponds to a number of the plurality of coverage regions; and a scheduler performing one of the first scheme and the second scheme according to the frequency reuse plan.

Advantageous Effects

In a frequency reusing method in a wireless communication system and an apparatus for the same according to the present invention, a first scheme and a second scheme are time-divisionally adopted depending on a magnitude of communicated signal between a radio access station and a corresponding portable subscriber station to obtain advantages of both a relatively high frequency reuse factor (FRF), which corresponds to the second scheme, and a relatively low frequency reuse factor (FRF), which corresponds to the first scheme, and avoid disadvantages of them.

A frequency reuse plan is flexibly adopted considering signal interference between adjacent sectors and between adjacent cells to perform one of the first and second schemes such that cell coverage and system capacity are improved.

Moreover, since a data frame includes a single control message during the second scheme, where different sub-frequency bands are respectively assigned to the coverage regions, a transmitting amount of the traffics increases and an over-header problem with respect to generating the data frame is reduced.

Furthermore, a frequency reusing method in a wireless communication system and an apparatus for the same according to the present invention are available not only in a single radio access station (RAS) having a plurality of sectors but also in multiple radio access stations (RAS) using an omnidirectional antenna.

In addition, a method of frequency reuse in a wireless communication system and an apparatus for the same according to the present invention provide excellent communication services to a radio access station (RAS) for portable internet services according to at least one of IEEE 802.16, WiBro and WiMAX standards.

BRIEF DESCRIPTION OF THE DRAWINGS

The accompanying drawings, which are included to provide a further understanding of embodiments of the invention and are incorporated in and constitute a part of this specification, illustrate embodiments of the invention and together with the description serve to explain the principles of embodiments of the invention. In the drawings.

BEST MODE FOR CARRYING OUT THE INVENTION

Reference will now be made in detail to the preferred embodiments of the invention, examples of which are illustrated in the accompanying drawings.

A radio access station (RAS) according to an embodiment of the present invention controls a frequency reusing plan such that a first scheme or a second scheme is applied to a plurality of coverage regions. In the firs scheme, a total frequency band, which includes a plurality of sub-frequency bands, is assigned to the plurality of coverage regions to transmit traffics. On the other hand, in the second scheme, the plurality of sub-frequency bands are assigned to the plurality of coverage regions to transmit the traffics. The first and second schemes are applied according to a time schedule. An orthogonal frequency division multiple access (OFDMA) scheme according to at least one of IEEE 802.16, WiBro and WiMAX standards is adopted to the radio access station (RAS).

In FIGS. 4 to 7, one radio access station (RAS) includes a plurality of coverage regions, e.g., first to third sectors 521, 531 and 541. The radio access station "RAS" determines a carrier to interference and noise ratio "CINR" from a communication signal with a portable subscriber station (PSS) and produce a frequency reusing plan depending on the carrier to interference and noise ratio "CINR". Then, based on the frequency reusing plan, the radio access station "RAS" assigns a total frequency band "F1+FA2+FA3", which may include first to third sub-frequency bands "F1", "FA2" and "FA3", to the first to third sectors 521, 531 and 541 or the first to third sub-frequency bands "FA1", "FA2" and "FA3" to the first to third sectors 521, 531 and 541, respectively, to transmit traffics. Moreover, as explained below, a ratio of a first interval "T1", where the traffics are transmitted by assigning the total frequency band "FA1+FA2+FA3" to all of the first to third sectors 521, 531 and 541, to a second interval "T2", where the traffics are transmitted by respectively assigning the first to third sub-frequency bands "FA1", "FA2" and "FA3" to the first to third sectors 521, 531 and 541, can be determined to be diverse.

Figure 1:
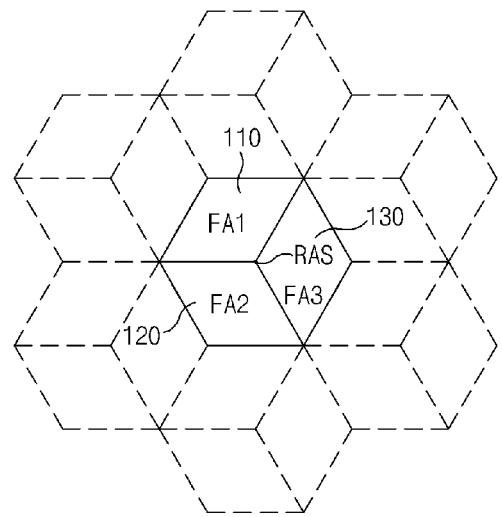
FIG. 1 is a schematic view showing a conventional radio access station (RAS) using a plurality of frequency bands.
Figure 2:
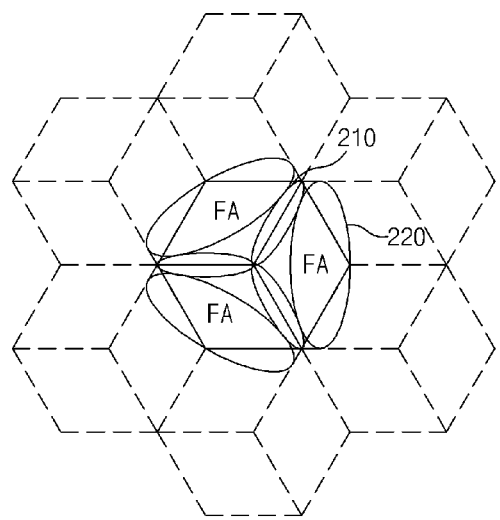
FIG. 2 is a schematic view showing a conventional radio access station (RAS) using an identical frequency band.
Figure 3:
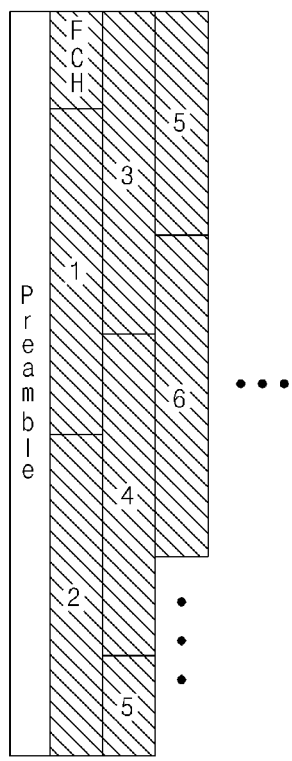
FIG. 3 is a schematic view showing a data frame sending and receiving between a radio access station (RAS) and a portable subscriber stations (PSS) in FIG. 2.
Figure 4:
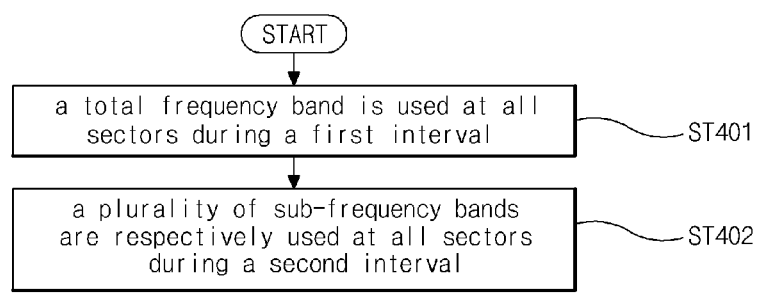
FIG. 4 is a flow chart to explain a frequency reusing method in a wireless communication system according to an embodiment of the present invention.

FIG. 4 is a flow chart to explain a frequency reusing method in a wireless communication system according to an embodiment of the present invention. The frequency reusing method in FIG. 4 is explained with FIGS. 5 to 7. Because the radio access station "RAS" according to the present invention transmits the traffics by respectively assigning the first to third sub-frequency bands "FA1", "FA2" and "FA3" to the first to third sectors 521, 531 and 541 after assigning the total frequency band "FA1+FA2+FA3" to the all sectors 521, 531 and 541, available coverage region are maximized and a system capacity increases. In more detail, because the total frequency band "FA1+FA2+FA3" including the first to third sub-frequency bands "FA1", "FA2" and "FA3" is assigned to all sectors 521, 531 and 541 during the first interval "T1", the system capacity is improved when compared to the conventional frequency reusing method shown in FIG. 1. It is because the total frequency band "FA1+FA2+FA3" has a wider frequency band than a single sub-frequency band. On the other hand, because a plurality of sub-frequency bands "FA1", "FA2" and "FA3" are respectively assigned to the first to third sectors 521, 531 and 541 during the second interval "T2" contrary to the conventional frequency reusing method in FIG. 2, a transmitting amount of data increases without repeatedly control messages and an over-header problem is prevented. A summation of the first and second intervals "T1" and "T2" corresponds to a total period. The first and second intervals "T1" and "T2" are repeatedly performed.

Figure 5:
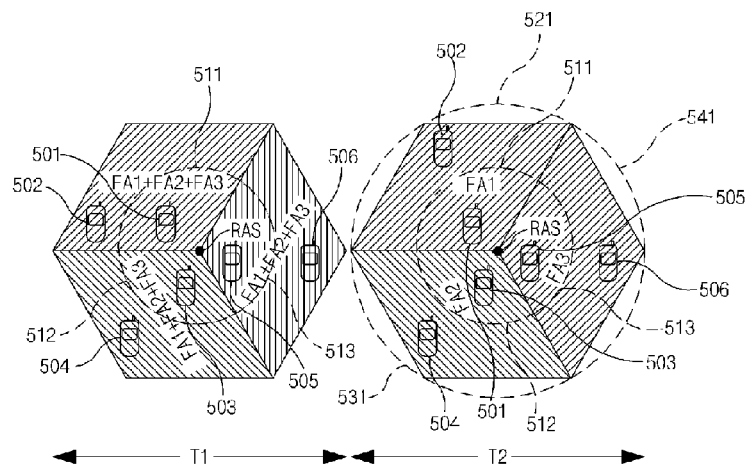
FIG. 5 is a schematic view to explain a traffic transmission during intervals according to a frequency reusing method in FIG. 4.
Figure 5:
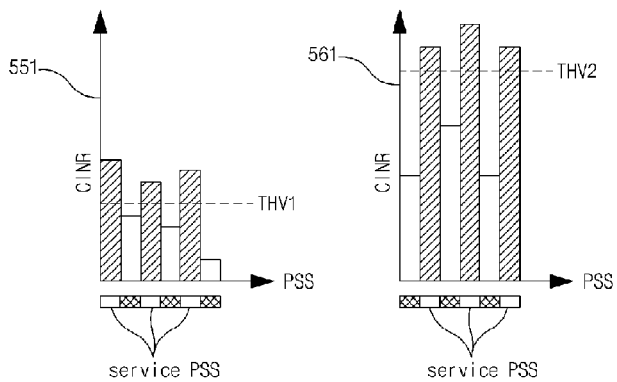

As shown in FIGS. 4 and 5, in a frequency reusing method according to the present invention, the radio access station "RAS" transmits the traffics by assigning the total frequency band "FA1+FA2+FA3" to all of the first to third sectors 521, 531 and 541 during the first interval "T1". (ST 401) It may be referred to as a first scheme. On the other hand, the radio access station "RAS" transmits the traffics by respectively assigning different three sub-frequency bands "FA1", "FA2" and "FA3" to the first to third sectors 521, 531 and 541 during the second interval "T2". (ST 402) It may be referred to as a second scheme. In this case, the first and second intervals "T1" and "T2" constitute the total period and are repeated.

In a fixing type, a ratio of the first interval "T1" to the second interval "T2" corresponds to N:M. N and M are positive integers. A ratio of N to M may be one of 1:1, 1:2, 2:1, and so on. The radio access station "RAS" measures the carrier to interference and noise ratio "CINR" from a communication signal with each of the portable subscriber station 501, 502, 503, 504, 505 and 506 to determines the ration of N to M depending on a magnitude of the carrier to interference and noise ratio "CINR". For example, the ratio of N to M may be fixed based on a mean value of the carrier to interference and noise ratio "CINR" during the first interval "T1" and a mean value of the carrier to interference and noise ratio "CINR" during the second interval "T2". On the other hand, in a variable type, a ratio of the first interval "T1" to the second interval "T2" is realtimely variable depending on variable values of the carrier to interference and noise ratio "CINR".

Referring again to FIG. 5, the radio access station "RAS" covers the first to third sectors 521, 531 and 541. The first and second portable subscriber stations 501 and 502 are positioned in the first sector 521, the third and fourth portable subscriber stations 503 and 504 are positioned in the second sector 531, and the fifth and sixth portable subscriber stations 505 and 506 are positioned in the third sector 541. When the total frequency band "FA1+FA2+FA3" is assigned to the first to third sectors 521, 531 and 541, the first, third and fifth portable subscriber stations 501, 503 and 505, which are respectively positioned in first, second and third regions 511, 512 and 513 to be closer to the radio access station "RAS" than the second, fourth and sixth portable subscriber stations 502, 504 and 506 and have a relatively low signal interference, have a carrier to interference and noise ratio "CINR" greater than a first threshold value "THV1". When the first, third and fifth portable subscriber stations 501, 503 and 505 are measured to have the carrier to interference and noise ratio "CINR" greater than the first threshold value "THV1" and be capable of being communicated with the radio access station "RAS" during the first interval "T1", the radio access station "RAS" determines the carrier to interference and noise ratio "CINR" to have qualifies as a reference of scheduling and performs the first scheme. Accordingly, the first, third and fifth portable subscriber station 501, 503 and 505 receive the traffics using the total frequency band "FA1+FA2+FA3" such that an excellent communication service with the radio access station "RAS" is secured.

On the other hand, when the total frequency band "FA1+FA2+FA3" is assigned to the first to third sectors 521, 531 and 541, the second, fourth and sixth portable sub scriber stations 502, 504 and 506, which are respectively positioned in the first, second and third sectors 521, 531 and 541 and out of the first, second and third regions 511, 512 and 513, have a relatively high signal interference and a carrier to interference and noise ratio "CINR" smaller than the first threshold value "THV1". When the second, fourth and sixth portable subscriber stations 502, 504 and 506 are measured to have the carrier to interference and noise ratio "CINR" smaller than the first threshold value "THV1" during the first interval "T1", where the first scheme is applied, the radio access station "RAS" changes the first scheme into the second scheme. Namely, during the second interval "T2", the radio access station "RAS" assigns the first, second and third sub-frequency band "FA1", "FA2" and "FA3" into the first, second and third sectors 521, 531 and 541, respectively, to communicate with the second, fourth and sixth portable subscriber stations 502, 504 and 506 with a relatively low signal interference. In this case, the radio access station "RAS" may apply a positive offset to transmit the traffics with a modulation level higher than the former modulation level when the first scheme is changed into the second scheme. Moreover, since the portable subscriber stations in border regions between adjacent sectors feel a relatively high signal interference because of an adjacent sector, they are treated as the second, fourth and sixth portable subscriber stations 502, 504 and 506.

Referring again to FIG. 5, a second threshold value "THV2" as a reference value during the second interval "T2" is greater than the first threshold value "THV1" as a reference value during the first interval "T1". In more detail, since the traffics are transmitted into the second, fourth and sixth portable subscriber stations 502, 504 and 506 having a relatively high signal interference during the second interval "T2", the second scheme, where the coverage region is maximized, is applied to transmit the traffics and the radio access station "RAS" uses the second threshold value "THV2", which is greater than the first threshold value "THV1", considering an improved carrier to interference and noise ratio "CINR". During the second interval "T2", where the second scheme is applied, when each of the second, fourth and sixth portable subscriber stations 502, 504 and 506 has the carrier to interference and noise ratio "CINR" greater than the second threshold value "THV2", the radio access station "RAS" changes the second scheme into the first scheme to increase the system capacity. In this case, the radio access station "RAS" may apply a negative offset to transmit the traffics with a modulation level lower than the former modulation level when the second scheme is changed into the first scheme. On the other hand, when each of the second, fourth and sixth portable subscriber stations 502, 504 and 506 has the carrier to interference and noise ratio "CINR" smaller than the second threshold value "THV2", the radio access station "RAS" keeps the second scheme.

Consequently, the first, third and fifth portable subscriber stations 501, 503 and 505 having a carrier to interference and noise ratio "CINR" greater than the first threshold value "THV1", which have a relatively less signal interference because of their position relatively close to the radio access station "RAS" communicate with the radio access station "RAS" in good condition during the first interval "T1" using receiving the traffics with the total frequency band "FA1+FA2+FA3". On the other hand, the second, fourth and sixth portable subscriber stations 502, 504 and 506 having a carrier to interference and noise ratio "CINR" smaller than the first threshold value "THV1", which have a relatively high signal interference because of their position relatively far from the radio access station "RAS", communicate with the radio access station "RAS" in good condition during the second interval "T2" using receiving the traffics with respective sub-frequency bands "FA1", "FA2" and "FA3".

The first and second threshold value "THV1" and "THV2" may be variably set depending on states of the first and second schemes. The radio access station "RAS" determines whether the present scheme is changed or not. Namely, when the portable subscriber station has a carrier to interference and noise ratio "CINR" smaller than the first threshold value "THV1" during the first interval "T1", the radio access station "RAS" changes the first scheme into the second scheme. Contrarily, when the portable subscriber station has a carrier to interference and noise ratio "CINR" greater than the second threshold value "THV2" during the second interval "T2", the radio access station "RAS" changes the second scheme into the first scheme.

The graphs 551 and 561 in FIG. 5 shows a carrier to interference and noise ratio "CINR" of each portable subscriber station and the first and second threshold values "THV1" and "THV2" during the first and second intervals "T1" and "T2", respectively. In a first graph 551, the portable subscriber stations having a carrier to interference and noise ratio greater than the first threshold value "THV1", which are the first, third and fifth portable subscriber stations 501, 503 and 505, during the first interval "T1", they communicate with the radio access station "RAS" by the first scheme. In this case, the first, third and fifth portable subscriber stations 501, 503 and 505 are defined as service portable subscriber stations (service PSS). On the other hand, in a second graph 561, the second, fourth and sixth portable subscriber stations 502, 504 and 506, which do not communicate with the radio access station "RAS" during the first interval "T1" because of their positions, communicate with the radio access station "RAS" during the second interval "T2" by using the respective sub-frequency bands "FA1", "FA2" and "FA3" by the second scheme. The second, fourth and sixth portable subscriber stations 501, 503 and 505 are defined as service portable subscriber stations (service PSS) during the second interval "T2". Accordingly, in a radio access station system according to the present invention, the radio access station communicates with the portable subscriber stations by the first scheme using a broad frequency band during the first interval "T1" to thereby increase the system capacity. Furthermore, the radio access station communicates with the portable subscriber stations by the second scheme using a narrow frequency band during the second interval "T2" to thereby have a relatively low signal interference. As a result, transmitting amount of the traffics increases without the repeated control messages and the over-header problem is prevented.

Figure 6:
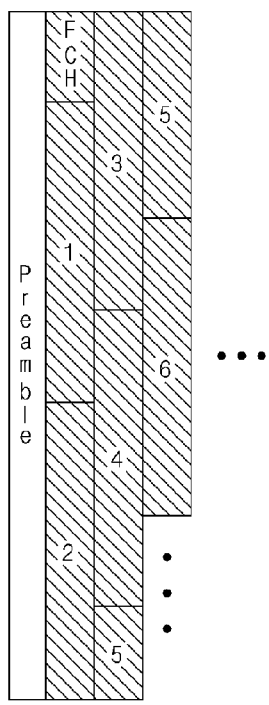
FIG. 6 is a schematic view to explain a data frame sending and receiving during an interval of T1 of FIG. 5.
Figure 7:
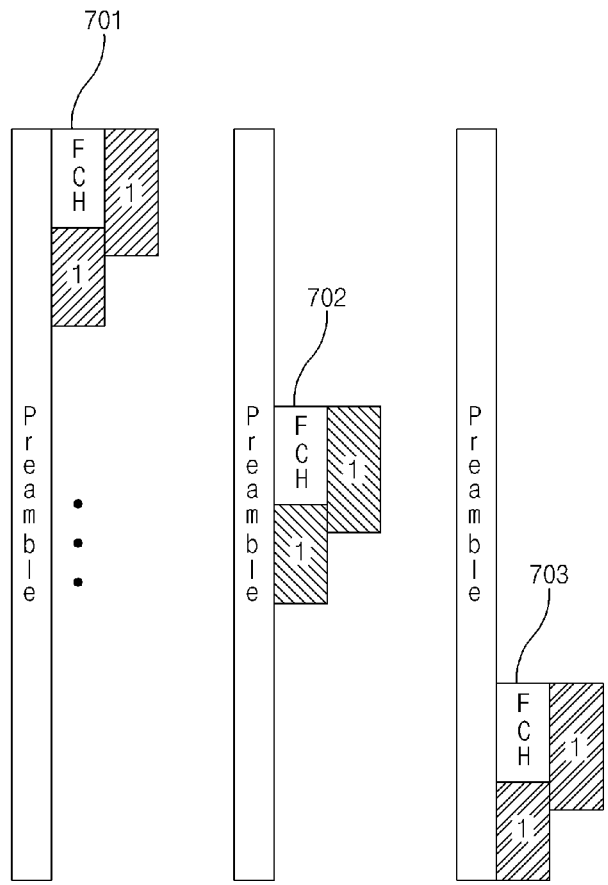
FIG. 7 is a schematic view to explain a data frame sending and receiving during an interval of T2 of FIG. 5.

FIGS. 6 and 7 show a data frame transmitted from a radio access station to a portable subscriber station during a first interval and a second interval, respectively.

In FIG. 6, the radio access station "RAS" (of FIG. 5) transmits a data frame by using the total frequency band "FA1+FA2+FA3" (of FIG. 5) to communicate with the first, third and fifth portable subscriber stations 501, 503 and 505 (of FIG. 5), which have a carrier to interference "CINR" (of FIG. 5) greater than the first threshold value "THV1" (of FIG. 5), in the first interval "T1" (of FIG. 5). The data frame follows a preamble and includes a frame control header "FCH", a control message for mapping a data region and a body. The control messages may be repeatedly sent to increase a receipt ratio of the traffics. For example, the control message is sent six times 1, 2, 3, 4, 5 and 6.

As shown in FIG. 7, data frames 701, 702 and 703, which respectively includes a single control message 1, is respectively sent to the portable subscriber stations at the first, second and third sectors 521, 531 and 541 (of FIG. 5) during the second interval "T2" (of FIG. 5) by using the first, second and third sub-frequency bands "FA1", "FA2" and "FA3" (of FIG. 5). As a result, the second, fourth and sixth portable subscriber stations 502, 504 and 506 (of FIG. 5), which have a carrier to interference and noise ratio "CINR" (of FIG. 5) less than the first threshold value "THV1" (of FIG. 5) during the first interval "T1" (of FIG. 5), in the first, second and third sectors 521, 531 and 541 (of FIG. 5) have a lessened signal interference during the second interval "T2" (of FIG. 5) and communicate with the radio access station "RAS" (of FIG. 5). Accordingly, in the first and second intervals "T1" and "T2", where the first and second schemes are respectively adopted, the portable subscriber stations in all sectors can communicate with the radio access station "RAS" with an improved receipt ratio of the traffics and a lessened over-header problem.

Furthermore, as shown in FIG. 7, since the radio access station "RAS" transmits the data frame including a single control message to the first, second and third sectors 521, 531 and 541 during the second interval "T2", a transmitting amount of the traffics increases. Although the data frame may include twice-repeated control messages to increase a receipt ratio of the control message, a transmitting amount of the traffics also increases.

Mode for the Invention

The frequency reusing method mentioned above may be applied into coverage regions with adjacent three radio access station.

Figure 8:
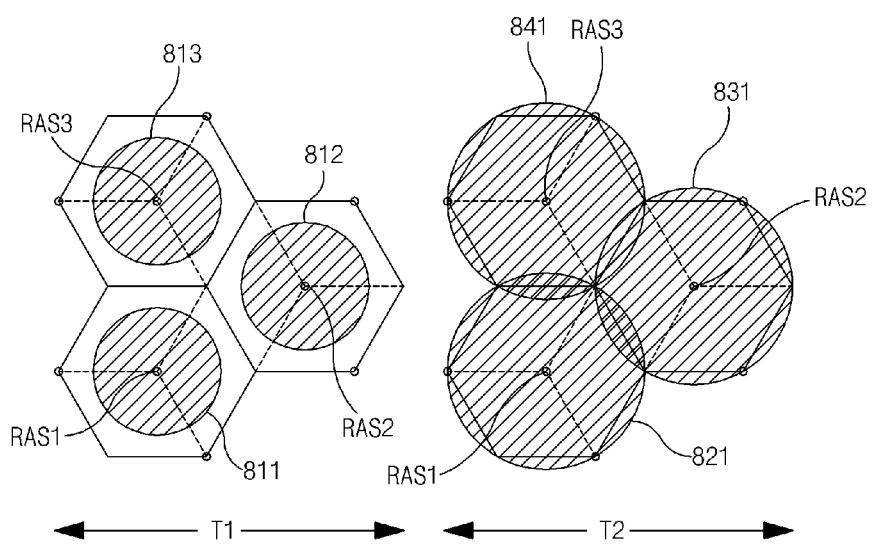
FIG. 8 is a schematic view to explain a traffic transmission during intervals according to a frequency reusing method of an embodiment of the present invention.

In FIG. 8, there are first, second and third radio access stations "RAS1", "RAS2" and "RAS3". Each of the first, second and third radio access stations "RAS1", "RAS2" and "RAS3" covers first, second and third cells 821, 831 and 841 including first, second and third adjacent regions 811, 812 and 813. During a first interval "T1", the first, second and third radio access stations "RAS1", "RAS2" and "RAS3" communicate with portable subscriber stations (not shown) in the first, second and third adjacent regions 811, 812 and 813 by assigning a total frequency band to the first, second and third cell 821, 831 and 841. It is referred to as a first scheme. On the other hand, the first, second and third radio access stations "RAS1", "RAS2" and "RAS3" communicate with portable subscriber stations (not shown) in the first, second and third cell 821, 831 and 841 during a second interval "T2" by respectively assigning first, second and third sub-frequency bands to the first, second and third cell 821, 831 and 841. It is referred to as a second scheme. The first, second and third sub-frequency bands constitute the total frequency band.

Namely, the first, second and third radio access stations "RAS1", "RAS2" and "RAS3" transmit the traffics to the portable subscriber station in the first, second and third adjacent regions 812, 813 and 814 during the first interval "T1" by assigning the total frequency band. The portable subscriber station in the first, second and third adjacent regions 812, 813 and 814 have a carrier to interference and noise ratio, which is measure by the radio access station or is sent to the radio access station from the portable subscriber station, greater than a first threshold value "THV1" (of FIG. 5). Then, the first, second and third radio access station "RAS1", "RAS2" and "RAS3" transmit the traffics to the portable subscriber station in the first, second and third cells 821, 831 and 841 during the second interval "T2" by respectively assigning the first, second and third sub-frequency bands divided from the total frequency band. As a result, the portable subscriber stations, which are in the first, second and third cells 821, 831 and 841 and far from the first, second and third radio access stations "RAS1", "RAS2" and "RAS3" such that they have a relatively low carrier to interference and noise ration during the first interval "T1", have a lessened signal interference and communicate with the first, second and third radio access stations "RAS1", "RAS2" and "RAS3" during the second interval "T2".

Data frames used in the frequency reusing method of FIG. 8 are similar to the data frames shown in FIGS. 6 and 7. Accordingly, explanation to the data frames is omitted.

Figure 9:
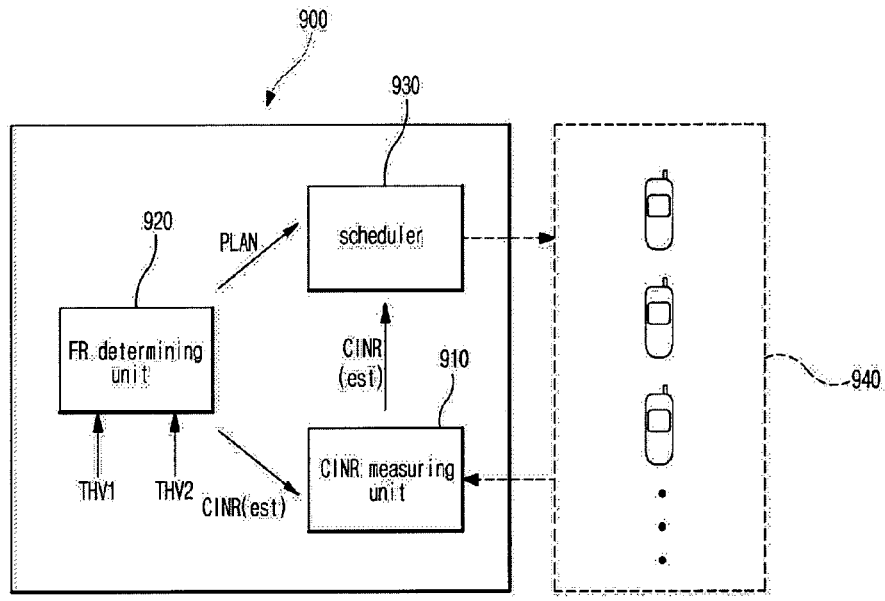
FIG. 9 is a block diagram to explain a radio access station (RAS) system according to an embodiment of the present invention.

FIG. 9 is a block diagram to explain a radio access station (RAS) system according to an embodiment of the present invention. In FIG. 9, a radio access station (RAS) system 900 according to the present invention includes a carrier to interference and noise ratio (CINR) measuring unit 910, a frequency reuse (FR) determining unit 920 and a scheduler 930. The radio access station (RAS) system 900 may be applied to a portable internet system and a wireless communication system where an orthogonal frequency division multiple access (OFDMA) type scheme according to at least one of IEEE 802.16, WiBro and WiMAX standards. The carrier to interference and noise ratio (CINR) measuring unit 910 measures a carrier to interference and noise ratio "CINR(mea)" from communication signals with portable subscriber stations 940. The carrier to interference and noise ratio "CINR (mea)" may be measured by detecting magnitude of signals sent by each portable subscriber station 940 during a period of up-link. On the other hand, the carrier to interference and noise ratio (CINR) measuring unit 910 may receive data of the carrier to interference and noise ratio "CINR(mea)" from each portable subscriber station 940 on a period of down-link. The carrier to interference and noise ratio (CINR) measuring unit 910 sends the measured carrier to interference and noise ratio "CINR(mea)" to the frequency reuse (FR) determining unit 920 and the scheduler 930.

The frequency reuse (FR) determining unit 920 compares the carrier to interference and noise ratio "CINR(mea)" and a first and second threshold values "THV1" and "THV2" to determine a frequency reuse plan "PLAN". When the carrier to interference and noise ratio (CINR) measuring unit 910 measures the carrier interference and noise ratio "CINR (mea)" during the first interval "T1", where the first scheme is adopted, the frequency reuse (FR) determining unit 920 compares the measured carrier to interference and noise ratio "CINR(mea)" with the first threshold value "THV1". On the other hand, when the carrier to interference and noise ratio (CINR) measuring unit 910 measures the carrier interference and noise ratio "CINR(mea)" during the second interval "T2", where the second scheme is adopted, the frequency reuse (FR) determining unit 920 compares the measured carrier to interference and noise ratio "CINR(mea)" with the second threshold value "THV2". The frequency reuse determining unit 1220 sends the frequency reuse plan "PLAN" to the scheduler 1230.

The scheduler 930 designs a first traffic transmission by assigning a total frequency band including a plurality of sub-frequency bands to a plurality of coverage regions or a second traffic transmission by respectively assigning the plurality of sub-frequency bands to the plurality of coverage regions. A number of the sub-frequency bands may correspond to a number of the coverage regions. In more detail, the scheduler 930 designs the first traffic transmission for all coverage regions by assigning the total frequency band to the plurality of coverage regions depending on the frequency reuse plan "PLAN" during the first interval "T1" (of FIG. 5) to adopt the first scheme. On the other hand, the scheduler 930 designs the second traffic transmission for each coverage region by respectively assigning the plurality of sub-frequency bands to the plurality of coverage regions depending on the frequency reuse plan "PLAN" during the second interval "T2" (of FIG. 5) to adopt the second scheme. In this case, the coverage region may correspond to each sector of a single radio access station shown in FIG. 5 or each cell of multiple radio access station shown in FIG. 8.

The scheduler 930 may designs a first type schedule, where a ratio of the first traffic transmission to the second traffic transmission is fixed, depending on the frequency reuse plan "PLAN". When the frequency reuse plan "PLAN" is determined by the frequency reuse (FR) determining unit 920, the scheduler 930 designs to assign the total frequency band for the first scheme and perform N times the first traffic transmission to all coverage regions. On the other hand, the scheduler 930 designs to respectively assign the sub-frequency bands for the second scheme and perform M times the second traffic transmission to all coverage regions. N and M are positive integers. A ratio of N to M may be determined depending on a magnitude of the carrier to interference and noise ratio "CINR(mea)". For example, the ratio of N to M may be one of 1:1, 1:2, 1:3, 1:4, 2:1, 2:2, 2:3, and so on. Considering a first mean value of the carrier to interference and noise ration "CINR(mea)" during the first interval for the first traffic transmission and a second mean value of the carrier to interference and noise ration "CINR(mea)" during the second interval for the second traffic transmission, the ratio of N to M may be determined to have an optimum value.

In addition, the scheduler 930 may designs a second type schedule, where a ratio of the first traffic transmission to the second traffic transmission is changed in realtime, depending on the frequency reuse plan "PLAN". In more detail, the scheduler 930 determines in realtime the frequency reuse plan "PLAN" including the first and second traffic transmissions by considering the first and second mean values of the carrier to interference and noise ratio "CINR(mea)" and the first and second threshold values "THV1" and "THV2" to change in realtime the ratio of the first traffic transmission to the second traffic transmission.

The radio access station system 900 measures the carrier to interference and noise ratio "CINR(mea)" of each portable subscriber station 940 via the carrier to interference and noise ratio (CINR) measuring unit 910 and then compares the carrier to interference and noise ratio "CINR(mea)" with one of the first and second threshold values "THV1" and "THV2" via the frequency reuse (FR) determining unit 920. In this case, the frequency reuse (FR) determining unit 920 detects whether the carrier to interference and noise ratio "CINR(mea)" is measured during the first interval "T1" or the second interval "T2". If the carrier to interference and noise ratio "CINR(mea)" is measured during the first interval "T1", the frequency reuse (FR) determining unit 920 compares the measured carrier to interference and noise ratio "CINR(mea)" with the first threshold value "THV1". On the other hand, if the carrier to interference and noise ratio "CINR(mea)" is measured during the second interval "T2", the frequency reuse (FR) determining unit 920 compares the measured carrier to interference and noise ratio "CINR(mea)" with the second threshold value "THV2" greater than the first threshold value "THV1". Considering comparing results, the frequency reuse plan "PLAN" is determined.

In the second scheme, where different sub-frequency bands are respectively assigned to the coverage regions, since the signal interference between adjacent coverage regions are lessened, the carrier to interference and noise ratio increases. Accordingly, as mentioned above, a communication service quality is secured when the carrier to interference and noise ratio is greater than the second threshold value "THV2" in the second scheme such that the first scheme is adopted to increase the system capacity.

The scheduler 930 is driven depending on the frequency reuse plan "PLAN" determined by the frequency reuse (FR) determining unit 920. When the carrier to interference and noise ratio "CINR(mea)" of the portable subscriber station 940 is measured to be greater than the first threshold value "THV1" in the first interval "T1", where the first scheme is adopted, the frequency reuse (FR) determining unit 920 determines the frequency reuse plan "PLAN" for the first traffic transmission such that the scheduler 930 maintains the first scheme for the corresponding portable subscriber station 940. On the other hand, when the carrier to interference and noise ratio "CINR(mea)" of the portable subscriber station 940 is measured to be smaller than the first threshold value "THV1" in the first interval "T1", where the first scheme is adopted, the frequency reuse (FR) determining unit 920 determines the frequency reuse plan "PLAN" for the second traffic transmission such that the scheduler 930 changes the first scheme into the second scheme for the corresponding portable subscriber station 940. Namely, when the former process for the corresponding portable subscriber station 940 is the first traffic transmission in the first scheme and the measured carrier to interference and noise ratio "CINR(mea)" of the corresponding portable subscriber station 940 is greater than the first threshold "THV1", the scheduler 930 keeps the first scheme in the corresponding portable subscriber station 940. On the other hand, when the former process for the corresponding portable subscriber station 940 is the first traffic transmission in the first scheme and the measured carrier to interference and noise ratio "CINR(mea)" of the corresponding portable subscriber station 940 is smaller than the first threshold "THV1", the scheduler 930 changes the first scheme into the second scheme for performing the second traffic transmission. For example, when keeping the first scheme, the scheduler 930 designs to perform the first traffic transmission with a modulation level corresponding to the measured carrier to interference and noise ratio. On the other hand, when changing the first scheme to the second scheme, the scheduler 930 designs to perform the second traffic transmission with a higher modulation level as much as a first offset than the measured carrier to interference and noise ratio. A modulation method used for a portable internet system includes about ten types, e.g., a quadrature phase shift keying (QPSK) 1/12 type, 16-quadrature amplitude modulation (16-QAM) type and 64-quadrature amplitude modulation (64-QAM) type. When the carrier to interference and noise ratio is relatively high, a high level modulation method may be used to increase a transmitting amount of the traffics. Contrarily, when the carrier to interference and noise ratio is relatively low, a low level modulation method may be used to decrease a transmitting amount of the traffics.

On the other hand, when the former process for the corresponding portable subscriber station 940 is the second traffic transmission in the second scheme and the measured carrier to interference and noise ratio "CINR(mea)" of the corresponding portable subscriber station 940 is greater than the second threshold "THV2", the scheduler 930 determines to communicate with the corresponding portable subscriber station 940 with a sufficient modulation level and changes the second scheme into the first scheme for increasing the system capacity. Contrarily, when the former process for the corresponding portable subscriber station 940 is the second traffic transmission in the second scheme and the measured carrier to interference and noise ratio "CINR(mea)" of the corresponding portable subscriber station 940 is smaller than the second threshold "THV2", the scheduler 930 determines to desirably communicate with the corresponding portable subscriber station 940 and keeps the second scheme in the corresponding portable subscriber station 940. For example, when keeping the second scheme, the scheduler 930 designs to perform the second traffic transmission with a modulation level corresponding to the measured carrier to interference and noise ratio. On the other hand, when changing the second scheme into the first scheme, the scheduler 930 designs to perform the first traffic transmission with a lower modulation level as much as a second offset than the measured carrier to interference and noise ratio.

Consequently, due to the frequency reusing method in the radio access station system according to the present invention, the system capacity increases because of an enlarged frequency band the cell coverage is maximized because of lessened signal interference.

Figure 10:
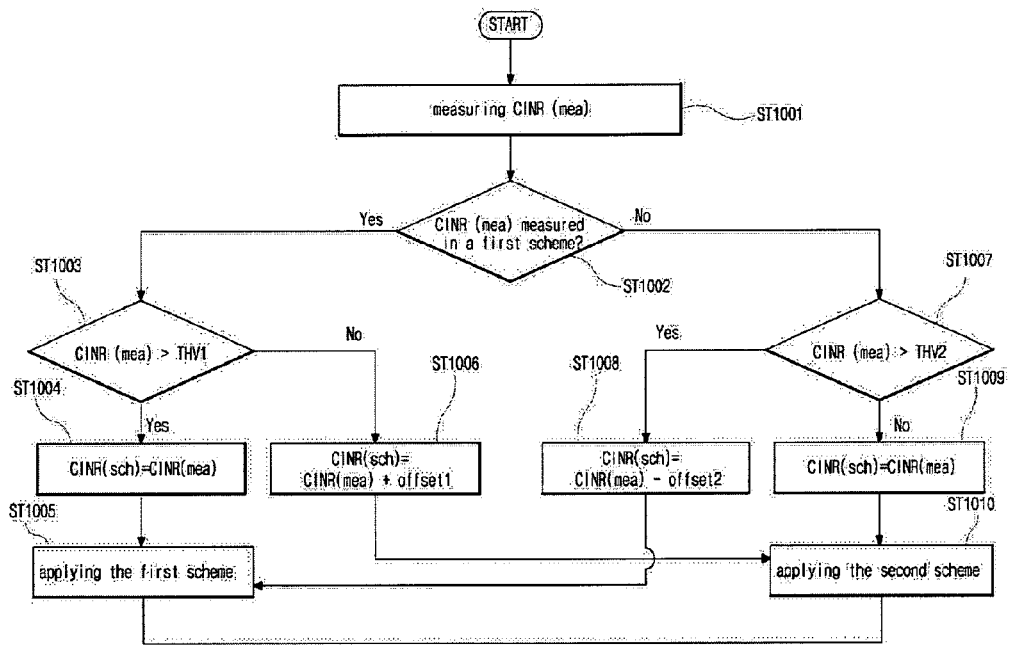
FIG. 10 is a flow chart to explain a determining method of a frequency reusing plane according to an embodiment of the present invention.

FIG. 10 is a flow chart to explain a determining method of a frequency reusing plane according to an embodiment of the present invention.

Referring to FIGS. 9 and 10, in a step 1001, the radio access station system 900 measures the carrier to interference and noise ratio "CINR(mea)" of corresponding portable subscriber station 940 via the carrier to interference and noise ratio (CINR) measuring unit 910. In a step 1002, the radio access station system 900 detects whether the carrier to interference and noise ratio "CINR(mea)" is measured in the first scheme or the second scheme.

When the measured carrier to interference and noise ratio "CINR(mea)" is measured in the first scheme, the radio access station system 900 estimates whether the measured carrier to interference and noise ratio "CINR(mea)" is greater than the first threshold value "THV1" or not, as shown in a step 1003. When the measured carrier to interference and noise ratio "CINR(mea)" is greater than the first threshold value "THV1", the radio access station system 900 treats the measured carrier to interference and noise ratio "CINR(mea)" as a scheduling carrier to interference and noise ratio "CINR(sch)", as shown in a step 1004. Next, the radio access station system 900 keeps the first scheme in the corresponding portable subscriber station 940 to perform the first traffic transmission with a modulation level corresponding to the scheduling carrier to interference and noise ratio "CINR(sch)". On the other hand, when the measured carrier to interference and noise ratio "CINR(mea)" is smaller than the first threshold value "THV1" as a result of the step 1003, the radio access station system 900 defines a scheduling carrier to interference and noise ratio "CINR(sch)" by performing the first offset "offset1" to obtain the scheduling carrier to interference and noise ratio "CINR(sch)" greater than the measured carrier to interference and noise ratio "CINR(mea)", as shown in a step 1006. The first offset "offset1" is performed to compensate a difference the scheduling carrier to interference and noise ratio "CINR(sch)" in the first scheme and the scheduling carrier to interference and noise ratio "CINR(sch)" in the second scheme. For example, the first offset "offset1" is performed considering mean values of the measured carrier to interference and noise ratio "CINR(mea)" in the first and second schemes. Next, in a step 1010, the radio access station system 900 adopts the second scheme in the corresponding portable subscriber station 940 with a modulation level corresponding to the scheduling carrier to interference and noise ratio "CINR(sch)" estimated from the step 1006.

On the other hand, when the measured carrier to interference and noise ratio "CINR(mea)" is measured in the second scheme as a result of the step 1002, the radio access station system 900 estimates whether the measured carrier to interference and noise ratio "CINR(mea)" is greater than the second threshold value "THV2" or not, as shown in a step 1007. If the measured carrier to interference and noise ratio "CINR(mea)" is greater than the second threshold value "THV2", the radio access station system 900 defines a scheduling carrier to interference and noise ratio "CINR(sch)" by performing the second offset "offset2" to obtain the scheduling carrier to interference and noise ratio "CINR(sch)" less than the measured carrier to interference and noise ratio "CINR(mea)", as shown in a step 1008. The second offset "offset2" is performed to compensate a difference the scheduling carrier to interference and noise ratio "CINR(sch)" in the second scheme and the scheduling carrier to interference and noise ratio "CINR(sch)" in the first scheme. For example, the second offset "offset2" is performed considering mean values of the measured carrier to interference and noise ratio "CINR(mea)" in the first and second schemes. Next, in a step 1005, the radio access station system 900 adopts the first scheme in the corresponding portable subscriber station 940 with a modulation level corresponding to the scheduling carrier to interference and noise ratio "CINR(sch)" estimated from the step 1008. On the other hand, when the measured carrier to interference and noise ratio "CINR(mea)" is smaller than the second threshold value "THV2" as a result of the step 1007, the radio access station system 900 treats the measured carrier to interference and noise ratio "CINR(mea)" as a scheduling carrier to interference and noise ratio "CINR(sch)", as shown in a step 1009. Next, the radio access station system 900 keeps the second scheme in the corresponding portable subscriber station 940 to perform the second traffic transmission with a modulation level corresponding to the scheduling carrier to interference and noise ratio "CINR(sch)".

The first and second offsets "offset1" and "offset2" may be performed to obtain optimum modulation levels for the corresponding portable subscriber station 940. Namely, when the radio access station system 900 perform the second scheme, where the coverage region is enlarged, depending on newly-determined frequency reuse plan "PLAN" after transmitting the traffics by the first scheme, the radio access station system 900 applies a positive offset, which correspond to the first offset "offset1", and transmits the traffics with a modulation level higher than the former modulation level to increase an transmitting amount of the traffics and provide a communication service for more portable subscriber stations. In addition, when the radio access station system 900 perform the first scheme, where the coverage region is lessened, depending on newly-determined frequency reuse plan "PLAN" after transmitting the traffics by the second scheme, the radio access station system 900 applies a negative offset, which correspond to the second offset "offset2", and transmits the traffics with a modulation level lower than the former modulation level to reduce an transmitting amount of the traffics and provide a communication service for portable subscriber station with a relatively low signal interference.

The radio access station (RAS) system according to the present invention includes a computer readable recording media having a program command to play various computer systems. The computer readable recording media may further include singly or combination of a data file and a data structure. The readable medium may be designed for the present invention. The readable media may be public ones. The computer readable recording media may be one of magnetic media such as a hard disc, a floppy disc and a magnetic tape, magnetic optical media such as optical recording media and floptical disc, and a hardware device storing and playing the program command, such as read only memory (ROM), random access memory (RAM), flash memory. The program command may includes not only machine language formed by a compiler but also high-level language by being played using an interpreter.

It will be apparent to those skilled in the art that various modifications and variations can be made in the portable internet radio access station including a plurality of management processors and the method of controlling the plurality of management processors of embodiments of the invention without departing from the spirit or scope of the invention. Thus, it is intended that embodiments of the invention cover the modifications and variations of this invention provided they come within the scope of the appended claims and their equivalents.

Industrial Applicability

In a radio access station (RAS) system according to the present invention, a first scheme and a second scheme are time-divisionally applied depending considering a magnitude of communicated signal between the radio access station (RAS) and a portable subscriber station (PSS) such that there are only advantages of both a relatively low frequency reuse factor (FRF), which correspond to the first scheme, and a relatively high frequency reuse factor (FRF) type scheme, which correspond to the second scheme, except disadvantages of them.

In more detail, a frequency reuse plan is flexibly adopted considering signal interference between adjacent sectors and between adjacent cells such that cell coverage and system capacity are improved.

The invention claimed is:

1. A frequency reusing method in a wireless communication system including a coverage region, which has first, second, and third regions, the method comprising:
   (a) measuring a carrier to interference and noise ratio (CINR) from a communication signal;
   (b) comparing the CINR with a first threshold value while a first scheme is being performed and comparing the CINR with a second threshold value while a second scheme is being performed, thereby determining a frequency reuse plan, wherein said first scheme corresponds to a first frequency reuse factor, said second scheme corresponds to a second frequency reuse factor, said second frequency reuse factor higher than said first frequency reuse factor;
   (c) transmitting traffics by assigning a total frequency band, which includes three different sub-frequency bands, to the first, second, and third regions during a first interval for the first scheme according to the frequency reuse plan; and
   (d) transmitting the traffics by respectively assigning the three different sub-frequency bands to the first, second, and third regions during a second interval for the second scheme according to the frequency reuse plan.

2. The frequency reusing method according to claim 1, wherein the (c) and (d) steps are repeated with a period, and wherein the period is a summation of the first and second intervals.

3. The frequency reusing method according to claim 1, wherein the traffics are transmitted by an orthogonal frequency division multiple access (OFDMA) scheme in the (c) step, and a transmitting data frame of the traffics includes control messages repeated at least three times in the (c) step.

4. The frequency reusing method according to claim 1, wherein a transmitting data frame of the traffics includes one of a single control message and twice-repeated control messages in the (d) step.

5. The frequency reusing method according to claim 1, wherein the coverage region is a cell covered by a single radio access station, and the first, second and third regions are sectors within the cell.

6. The frequency reusing method according to claim 1, wherein the first region is a cell covered by a single radio access station, and the second and third regions are cells covered by two radio access stations adjacent to the single radio access station.

7. A frequency reusing method in a wireless communication system including a plurality of coverage regions, the method comprising:
   (a) measuring a carrier to interference and noise ratio (CINR) from communication signals with a portable subscriber station;
   (b) producing a frequency reuse plan depending on the carrier to interference and noise ratio (CINR); and
   (c) transmitting one of a first traffic and a second traffic according to the frequency reuse plan,
   wherein the first traffic is transmitted to the plurality of coverage regions by assigning a total frequency band, which includes a plurality of sub-frequency bands, during a first interval for a first scheme, and wherein the second traffic is transmitted to the plurality of coverage regions by respectively assigning the plurality of sub-frequency bands to the plurality of coverage regions during a second interval for a second scheme, wherein said first scheme corresponds to a first frequency reuse factor, said second scheme corresponds to a second frequency reuse factor, said second frequency reuse factor higher than said first frequency reuse factor,
   wherein producing the frequency reuse plan comprises:
      comparing the CINR with a first threshold value while the first scheme is being performed; and
      comparing the CINR with a second threshold value while the second scheme is being performed, and
   wherein a number of the plurality of coverage regions corresponds to a number of the plurality of sub-frequency bands.

8. The frequency reusing method according to claim 7, wherein a ratio of the first interval to the second interval is fixed or variable.

9. The frequency reusing method according to claim 7, wherein the frequency reuse plan is repeatedly produced with a period, and
   wherein the period is a summation of the first and second intervals.

10. The frequency reusing method according to claim 7, wherein the frequency reuse plan is produced to transmit the first traffic when the carrier to interference and noise ratio (CINR) measured during the first interval is greater than the first threshold value, and
    wherein the frequency reuse plan is produced to transmit the second traffic when the carrier to interference and noise ratio (CINR) measured during the first interval is smaller than the first threshold value.

11. The frequency reusing method according to claim 10, wherein the second traffic is transmitted with a modulation level that is higher by as much as a first offset than the carrier to interference and noise ratio (CINR) when the carrier to interference and noise ratio (CINR) measured during the first interval is smaller than the first threshold value.

12. The frequency reusing method according to claim 7, wherein the frequency reuse plan is produced to transmit the second traffic when the carrier to interference and noise ratio (CINR) measured during the second interval is smaller than the second threshold value, and
    wherein the frequency reuse plan is produced to transmit the first traffic when the carrier to interference and noise ratio (CINR) measured during the second interval is greater than the second threshold value.

13. The frequency reusing method according to claim 12, wherein the first traffic is transmitted with a modulation level that is lower by as much as a second offset than the carrier to interference and noise ratio (CINR) when the carrier to interference and noise ratio (CINR) measured during the second interval is greater than the second threshold value.

14. The frequency reusing method according to claim 7, wherein a data frame for the first traffic transmission includes control messages repeated at least three times, and a data frame for the second traffic transmission includes one of a single control message and twice-repeated control messages.

15. The frequency reusing method according to claim 7, wherein the plurality of coverage regions correspond to cell regions of adjacent radio access stations or sectors of a single radio access station.

16. The frequency reusing method according to claim 7, wherein the frequency reusing method is used for a communication system according to at least one of IEEE 802.16, WiBro, and WiMAX standards.

17. A radio access station (RAS) system for a frequency reuse, the system comprising:
    a carrier to interference and noise ratio (CINR) measuring unit configured to measure a carrier to interference and noise ratio (CINR) of corresponding portable subscriber stations in a plurality of coverage regions;
    a frequency reuse (FR) determining unit configured to determine a frequency reuse plan by comparing the carrier to interference and noise ratio (CINR) with one of first and second threshold values, the frequency reuse plan including a first scheme, where a total frequency band including a plurality of sub-frequency bands is assigned to the plurality of coverage regions to transmit traffic, and a second scheme, where the plurality of sub-frequency bands are respectively assigned to the plurality of coverage regions to transmit the traffic, wherein a number of the plurality of sub- frequency bands corresponds to a number of the plurality of coverage regions, wherein said first scheme corresponds to a first frequency reuse factor, said second scheme corresponds to a second frequency reuse factor, said second frequency reuse factor higher than said first frequency reuse factor; and
    a scheduler configured to perform one of the first scheme and the second scheme according to the frequency reuse plan,
    wherein the frequency reuse determining unit is configured to compare the carrier to interference and noise ratio (CINR) with the first threshold value while the first scheme is being performed and to compare the carrier to interference and noise ratio (CINR) with the second threshold value while the second scheme is being performed.

18. The radio access station (RAS) system according to claim 17, wherein a data frame for transmitting the traffic in the second scheme includes one of a single control message and twice-repeated control messages.

19. The radio access station (RAS) system according to claim 17, wherein the plurality of coverage regions correspond to cell regions of adjacent radio access stations or sectors of a single radio access station.

20. The radio access station (RAS) system according to claim 17, wherein the scheduler is configured to perform the first scheme during a first interval and the second scheme during a second interval, and wherein a ratio of the first interval to the second interval is fixed depending on a magnitude of the carrier to interference and noise ratio (CINR).

21. The radio access station (RAS) system according to claim 17, wherein the scheduler is configured to perform the first scheme during a first interval and the second scheme during a second interval, and wherein a ratio of the first interval to the second interval is determined in real-time depending on a magnitude of the carrier to interference and noise ratio (CINR).

22. The radio access station (RAS) system according to claim 17, wherein the first and second schemes are repeatedly performed with a period, and
    wherein the period is a summation of an interval for the first scheme and an interval for the second scheme.

23. The radio access station (RAS) system according to claim 17, wherein the first threshold value is smaller than the second threshold value.

24. The radio access station (RAS) system according to claim 17, wherein the frequency reuse (FR) determining unit is configured to determine the frequency reuse plan to keep the first scheme when the carrier to interference and noise ratio (CINR) measured during the first scheme is greater than the first threshold value, and to adopt the second scheme when the carrier to interference and noise ratio (CINR) measured during the first scheme is smaller than the first threshold value.

25. The radio access station (RAS) system according to claim 24, wherein the second scheme is applied with a modulation level that is higher by as much as a first offset than the carrier to interference and noise ratio (CINR) when the carrier to interference and noise ratio (CINR) measured during the first scheme is smaller than the first threshold value.

26. The radio access station (RAS) system according to claim 17, wherein the frequency reuse (FR) determining unit is configured to determine the frequency reuse plan to keep the second scheme when the carrier to interference and noise ratio (CINR) measured during the second scheme is smaller than the second threshold value, and to adopt the first scheme when the carrier to interference and noise ratio (CINR) measured during the second scheme is greater than the second threshold value.

27. The radio access station (RAS) system according to claim 26, wherein the first scheme is applied with a modulation level that is lower by as much as a second offset than the carrier to interference and noise ratio (CINR) when the carrier to interference and noise ratio (CINR) measured during the second scheme is greater than the second threshold value.

28. The radio access station (RAS) system according to claim 17, wherein the radio access station (RAS) system is used for a communication system according to at least one of IEEE 802.16, WiBro, and WiMAX standards.

29. The frequency reusing method of claim 1, wherein the first threshold value is smaller than the second threshold value.

30. The frequency reusing method of claim 7, wherein the first threshold value is smaller than the second threshold value.

* * * * *